United States Patent
Yoon et al.

(10) Patent No.: US 11,297,265 B1
(45) Date of Patent: Apr. 5, 2022

(54) IMAGE SENSOR AND OPERATION METHOD OF THE SAME

(71) Applicant: SAMSUNG ELECTRONICS CO., LTD., Suwon-si (KR)

(72) Inventors: Daekun Yoon, Suwon-si (KR); Deokyoung Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/203,156

(22) Filed: Mar. 16, 2021

(30) Foreign Application Priority Data

Oct. 22, 2020 (KR) .......................... 10-2020-0137632

(51) Int. Cl.
*H04N 5/347* (2011.01)
*H04N 5/351* (2011.01)
*H04N 5/3745* (2011.01)
*H04N 9/04* (2006.01)

(52) U.S. Cl.
CPC ............. *H04N 5/351* (2013.01); *H04N 5/347* (2013.01); *H04N 5/37455* (2013.01); *H04N 5/37457* (2013.01); *H04N 9/0451* (2018.08)

(58) Field of Classification Search
CPC .............................. H04N 5/347; H04N 5/3742
USPC ........................ 348/294, 300, 301; 250/208.1
See application file for complete search history.

(56) References Cited

U.S. PATENT DOCUMENTS

| | | | |
|---|---|---|---|
| 6,947,086 B1 * | 9/2005 | Rutten | ..................... H04N 5/32 250/208.1 |
| 7,573,037 B1 * | 8/2009 | Kameshima | ............. A61B 6/00 250/370.09 |
| 8,780,238 B2 | 7/2014 | Bowers | |
| 2009/0200451 A1 * | 8/2009 | Conners | ............. H04N 5/37457 250/208.1 |
| 2012/0112040 A1 | 5/2012 | Cho | |
| 2012/0194720 A1 | 8/2012 | Bowers | |
| 2014/0218567 A1 | 8/2014 | Han | |
| 2020/0036930 A1 * | 1/2020 | Hanzawa | ............... H04N 5/374 |
| 2020/0045251 A1 * | 2/2020 | Koizumi | ........... H01L 27/14627 |

FOREIGN PATENT DOCUMENTS

| | | |
|---|---|---|
| KR | 10-2011-0062981 A | 6/2011 |
| KR | 10-1181312 B1 | 9/2012 |
| KR | 10-2014-0099625 A | 8/2014 |
| KR | 10-2017-0007706 A | 1/2017 |
| KR | 10-2019-0139788 A | 12/2019 |

* cited by examiner

*Primary Examiner* — Anthony J Daniels
(74) *Attorney, Agent, or Firm* — Sughrue Mion, PLLC

(57) ABSTRACT

Provided is an operation method of an image sensor including a plurality of pixels, the operation method including transmitting a first output voltage of a first pixel to a first amplifier, transmitting the first output voltage to a second amplifier by controlling a first switch connected to the first pixel, transmitting a second output voltage of a second pixel to be binned with the first pixel to the second amplifier by controlling a second switch connected to the second pixel, and outputting selectively one of a first output of the first amplifier and a second output of the second amplifier based on an illuminance of an environment in which the image sensor operates.

20 Claims, 8 Drawing Sheets

IMAGE SENSOR AND OPERATION METHOD OF THE SAME

CROSS-REFERENCE TO RELATED APPLICATION

This application claims priority from Korean Patent Application No. 10-2020-0137632 filed on Oct. 22, 2020 in the Korean Intellectual Property Office, the disclosure of which is incorporated herein by reference in its entirety.

BACKGROUND

1. Field

Methods and apparatuses consistent with example embodiments relate to an image sensor and an operation method of the image sensor.

2. Description of Related Art

An image sensor is a semiconductor device that converts incident light to an electrical signal. The image sensor includes an array of small photodiodes each referred to as a pixel or a photosite. In general, a pixel converts a photon of a wide spectral band to an electron, without directly extracting a color from light. Thus, the pixel of the image sensor may need to receive light of a band needed for obtaining a color, of the light of the wide spectral band. The pixel of the image sensor may convert only a photon corresponding to a certain color to an electron by being combined with a color filter.

The number of pixels in the image sensor, that is, a resolution, increasing may result in an increase in an amount of data to be processed. Thus, binning that bins data of multiple pixels into a single set of data is used.

SUMMARY

One or more example embodiments provide an image sensor and an operation method of the image sensor.

One or more example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an operation method of an image sensor including a plurality of pixels, the operation method including transmitting a first output voltage of a first pixel to a first amplifier, transmitting the first output voltage to a second amplifier by controlling a first switch connected to the first pixel, transmitting a second output voltage of a second pixel to be binned with the first pixel to the second amplifier by controlling a second switch connected to the second pixel, and outputting selectively one of a first output of the first amplifier and a second output of the second amplifier by an illuminance of an environment in which the image sensor operates.

Each of the first output voltage of the first pixel and the second output voltage of the second pixel may be an output voltage of a pixel source follower corresponding to a collected electric charge of each of the first pixel and the second pixel.

The second amplifier may be configured to add the first output voltage of the first pixel and the second output voltage of the second pixel based on on-off timing of the first switch and on-off timing of the second switch.

The outputting may include generating a control signal based on the illuminance, and controlling a multiplexer to which the first output of the first amplifier and the second output of the second amplifier are input based on the control signal.

The operation method may further include transmitting the second output voltage of the second pixel to a third amplifier by controlling a third switch connected to the second pixel.

Each of the plurality of pixels may be one of a red pixel, a green pixel, and a blue pixel, and the plurality of pixels may be provided in a Bayer pattern.

The second pixel may be provided in a same row as the first pixel, and a color of the second pixel may be same as a color as the first pixel.

The plurality of pixels may be respectively configured to generate an output signal based on incident light transmitted through a lens array that includes a plurality of lenses.

According to another aspect of an example embodiment, there is provided an image sensor including a pixel array including a plurality of pixels, a row driver configured to control the pixel array, a binning circuit including a plurality of switches, a plurality of amplifiers, and a plurality of multiplexers, an analog-to-digital converter (ADC) circuit configured to process an output of the binning circuit, and a control circuit configured to control the row driver, the binning circuit, and the ADC circuit, wherein the control circuit is further configured to transmit a first output voltage of a first pixel to a first amplifier by controlling the row driver, transmit the first output voltage to a second amplifier by controlling a first switch connected to the first pixel, transmit a second output voltage of a second pixel to be binned with the first pixel to the second amplifier by controlling a second switch connected to the second pixel, and output selectively one of a first output of the first amplifier and a second output of the second amplifier based on an illuminance of an environment in which the image sensor operates.

Each of the first output voltage of the first pixel and the second output voltage of the second pixel may be an output voltage of a pixel source follower corresponding to a collected electric charge of each of the first pixel and the second pixel.

The second amplifier may be configured to add the first output voltage of the first pixel and the second output voltage of the second pixel based on on-off timing of the first switch and on-off timing of the second switch.

The control circuit may be further configured to generate a control signal based on the illuminance, and control a multiplexer to which the first output of the first amplifier and the second output of the second amplifier are input based on the control signal.

The control circuit may be further configured to transmit the second output voltage of the second pixel to a third amplifier by controlling a third switch connected to the second pixel.

Each of the plurality of pixels may be one of a red pixel, a green pixel, and a blue pixel, and the plurality of pixels may be provided in a Bayer pattern.

The second pixel may be provided in a same row as the first pixel, and a color of the second pixel may be same as a color of the first pixel.

The plurality of pixels may be respectively configured to generate an output signal based on incident light transmitted through a lens array that includes a plurality of lenses.

According to yet another aspect of an example embodiment, there is provided an electronic device including an image sensor configured to output a digital signal, the image sensor including a pixel array including a plurality of pixels, a row driver configured to control the pixel array, a binning circuit including a plurality of switches, a plurality of amplifiers, and a plurality of multiplexers, an analog-to-digital converter (ADC) circuit configured to process an output of the binning circuit, and a control circuit configured to control the row driver, the binning circuit, and the ADC circuit, wherein the control circuit is further configured to transmit a first output voltage of a first pixel to a first amplifier by controlling the row driver, transmit the first output voltage to a second amplifier by controlling a first switch connected to the first pixel, transmit a second output voltage of a second pixel to be binned with the first pixel to the second amplifier by controlling a second switch connected to the second pixel, and output selectively one of a first output of the first amplifier and a second output of the second amplifier based on an illuminance of an environment in which the image sensor operates, a memory configured to store the digital signal output from the image sensor, and a processor configured to control the image sensor and the memory.

Each of the first output voltage of the first pixel and the second output voltage of the second pixel may be an output voltage of a pixel source follower corresponding to a collected electric charge of each of the first pixel and the second pixel.

The second amplifier may be configured to add the first output voltage of the first pixel and the second output voltage of the second pixel based on on-off timing of the first switch and on-off timing of the second switch.

The control circuit may be further configured to generate a control signal based on the illuminance, and control a multiplexer to which the first output of the first amplifier and the second output of the second amplifier are input based on the control signal.

BRIEF DESCRIPTION OF THE DRAWINGS

The above and/or other aspects will be more apparent by describing certain example embodiments, taken in conjunction with the accompanying drawings, in which.

DETAILED DESCRIPTION

Figure 1:
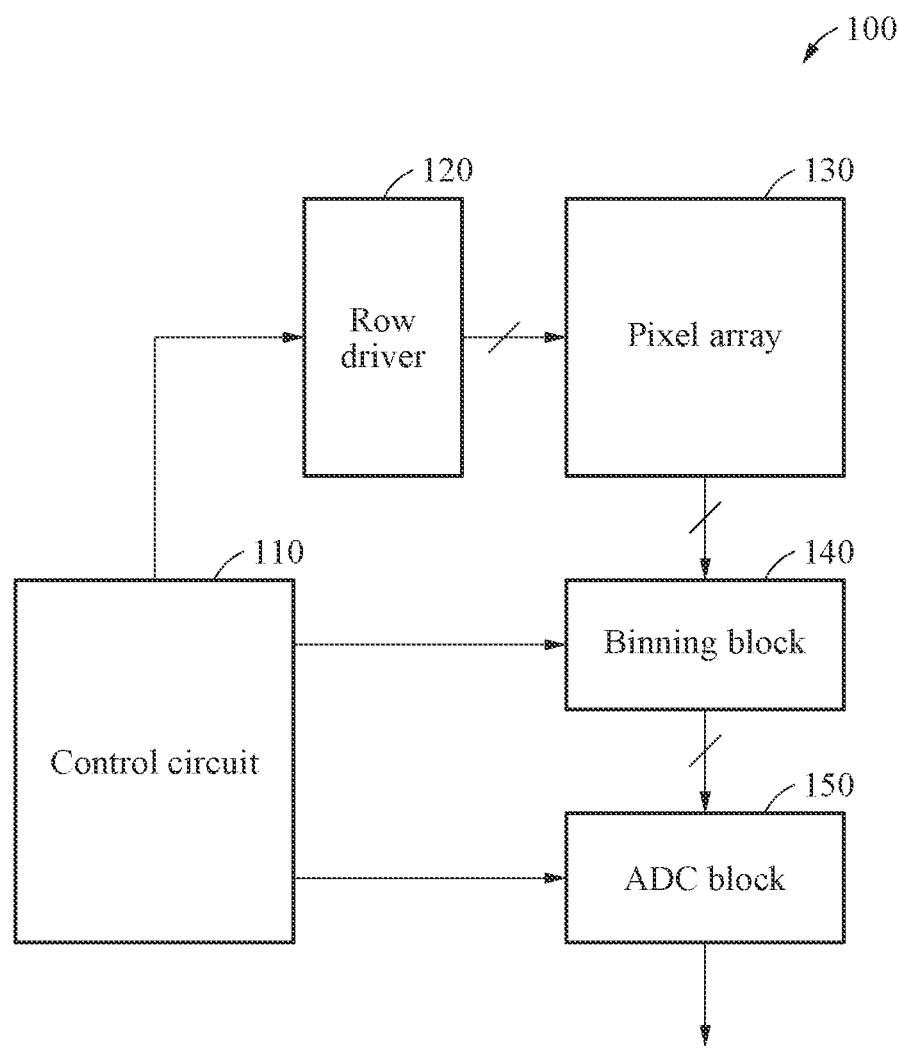
FIG. 1 illustrates an example of a configuration of an image sensor according to an example embodiment.

Reference will now be made in detail to example embodiments, examples of which are illustrated in the accompanying drawings, wherein like reference numerals refer to the like elements throughout.

The following structural or functional descriptions are exemplary to merely describe the example embodiments, and the scope of the example embodiments is not limited to the descriptions provided in the disclosure. Various changes and modifications can be made thereto by those of ordinary skill in the art.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components or a combination thereof, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Unless otherwise defined herein, all terms used herein including technical or scientific terms have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, examples will be described in detail with reference to the accompanying drawings, and like reference numerals in the drawings refer to like elements throughout. Also, in the description of example embodiments, detailed description of structures or functions that are thereby known after an understanding of the disclosure of the present application will be omitted when it is deemed that such description will cause ambiguous interpretation of the example embodiments.

FIG. 1 illustrates an example of a configuration of an image sensor according to an example embodiment.

Referring to FIG. 1, an image sensor 100 includes a control circuit 110, a row driver 120, a pixel array 130, a binning block (binning circuit) 140, and an analog-to-digital converter (ADC) block (ADC circuit) 150.

The pixel array 130 may detect incident light and generate an analog signal. The pixel array 130 may include a plurality of pixels arranged in each row and column. Each of the pixels may detect the incident light to generate an electrical signal. The pixels may convert the incident light to a voltage signal.

The pixel array 130 may transmit light of a certain wavelength to each of the pixels through a color filter that allows light of a certain wavelength to pass therethrough. Each of the pixels may be one of a red (R) pixel, a green (G) pixel, and a blue (B) pixel, based on a wavelength of incident light.

R, G, and B pixels may be arranged in a pattern. For example, the pixels of the pixel array 130 may be arranged in a Bayer pattern, but embodiments are not limited thereto.

The control circuit 110 may control an overall operation of the image sensor 100 through a control signal. For example, the control circuit 110 may control the row driver 120 based on a first control signal, control the binning block 140 based on a second control signal, and control the ADC block 150 based on a third control signal. The control circuit 110 may be a timing circuit or a timing controller.

The row driver 120 may activate the pixel array 130 by a row unit under the control of the control circuit 110. For example, the row driver 120 may activate pixels arranged in a row of the pixel array 130 based on the first control signal.

The binning block 140 may perform binning in a low-illuminance environment in which the image sensor 100 operates. The binning block 140 may selectively perform binning based on an illuminance, or an intensity of illumination, in an environment in which the image sensor 100 operates. Under the control of the control circuit 110, the binning block 140 may output a signal on which binning is performed to the ADC block 150 in a low-illuminance environment, and transmit a signal on which binning is not performed to the ADC block 150 in another environment that is not the low-illuminance environment.

The binning block 140 may perform binning based on an output voltage of a pixel source follower of a pixel. Using an output voltage of the pixel source follower, the binning block 140 may reuse an output voltage of a pixel on which binning is performed.

The ADC block 150 may generate a digital signal based on an output signal of the binning block 140. The ADC block 150 may convert the output signal to the digital signal by performing correlated double sampling (CDS). Based on the digital signal generated by the ADC block 150, an image may be generated.

The image sensor 100 may generate an image based on an incident ray transmitted through a lens array including a plurality of lenses. Using the lens array, the image sensor 100 may generate an image of a higher resolution. For example, using the lens array, it is possible to obtain a signal of a higher quality even though the size of the pixels included in the image sensor 100 decreases to be smaller.

FIGS. 2A through 2D illustrate examples of binning according to an example embodiment. The image sensor 100 may perform binning using methods to be described hereinafter with reference to FIGS. 2A through 2D.

Figure 2A:
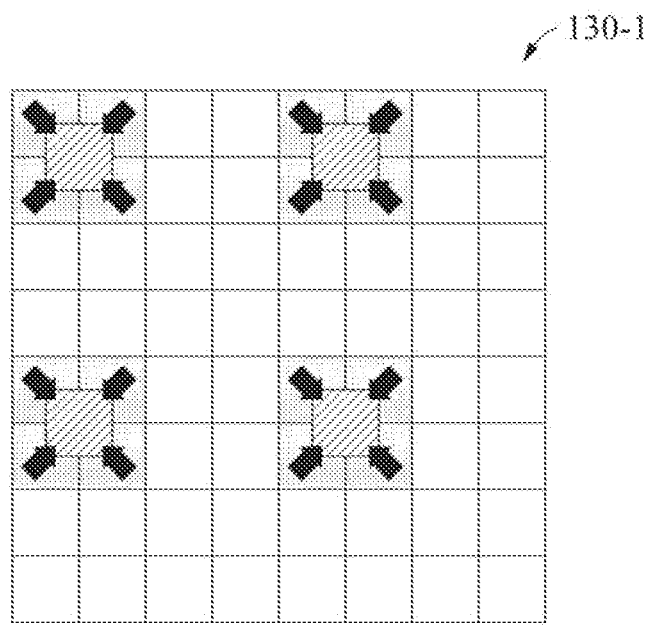
FIGS. 2A, 2B, 2C, and 2D illustrate examples of binning according to an example embodiment.

FIG. 2A illustrates a tetra method 130-1. A tetra method may be a binning method that merges four neighboring pixels. Using the tetra method, it is possible to improve the sensitivity of an image sensor by merging four neighboring pixels of the same color in a pixel array in which two pixels of the same color are repeated in each row and two pixels of the same color are repeated in each column.

Figure 2B:
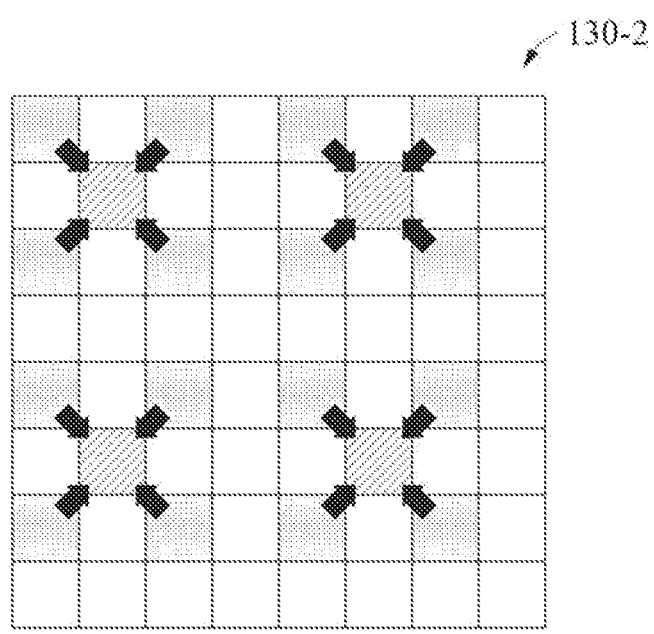

FIG. 2B illustrates a first Bayer method 130-2. A first Bayer method may be a binning method that merges pixels of the same color, with one pixel being therebetween, in a pixel array arranged in a Bayer pattern. Using the first Bayer method, it is possible to improve the sensitivity of an image sensor by merging pixels at four vertices of a tetragon of a 3*3 size.

Figure 2C:
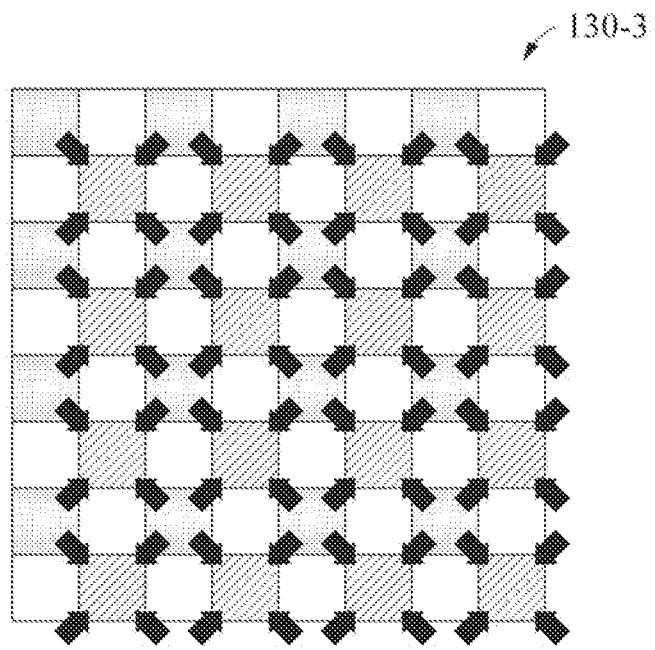

FIG. 2C illustrates a second Bayer method 130-3. A second Bayer method may be a similar binning method as the first Bayer method, which merges pixels of the same color, with one pixel being therebetween, in a pixel array arranged in a Bayer pattern. Through this method, the pixels may be reused. Using the second Bayer method, a pixel that is not arranged at a vertex among pixels arranged at an edge of the pixel array 130 may be merged with other pixels twice, and pixels arranged inside may be merged with other pixels four times each.

Figure 2D:
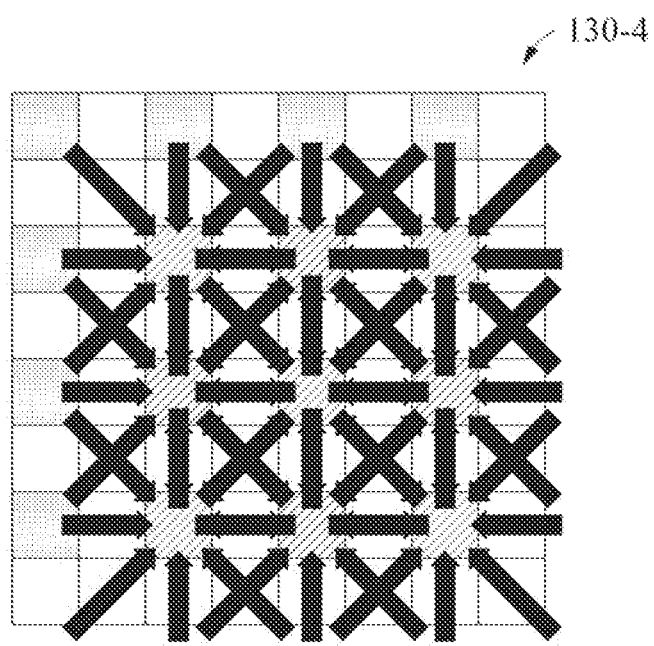

FIG. 2D illustrates an extended second Bayer method 130-4 that is obtained by extending the second Bayer method to a 3*3 size. An extended second Bayer method may be a binning method that merges pixels of three same colors by nine pixels of the same color each, with a new one pixel being therebetween. Using the extended second Bayer method, as in the second Bayer method, each pixel may be reused and thus be merged with other pixels multiple times.

The example binning methods illustrated in FIGS. 2A through 2D may be performed by partially changing a configuration of the binning block 140.

Figure 3:
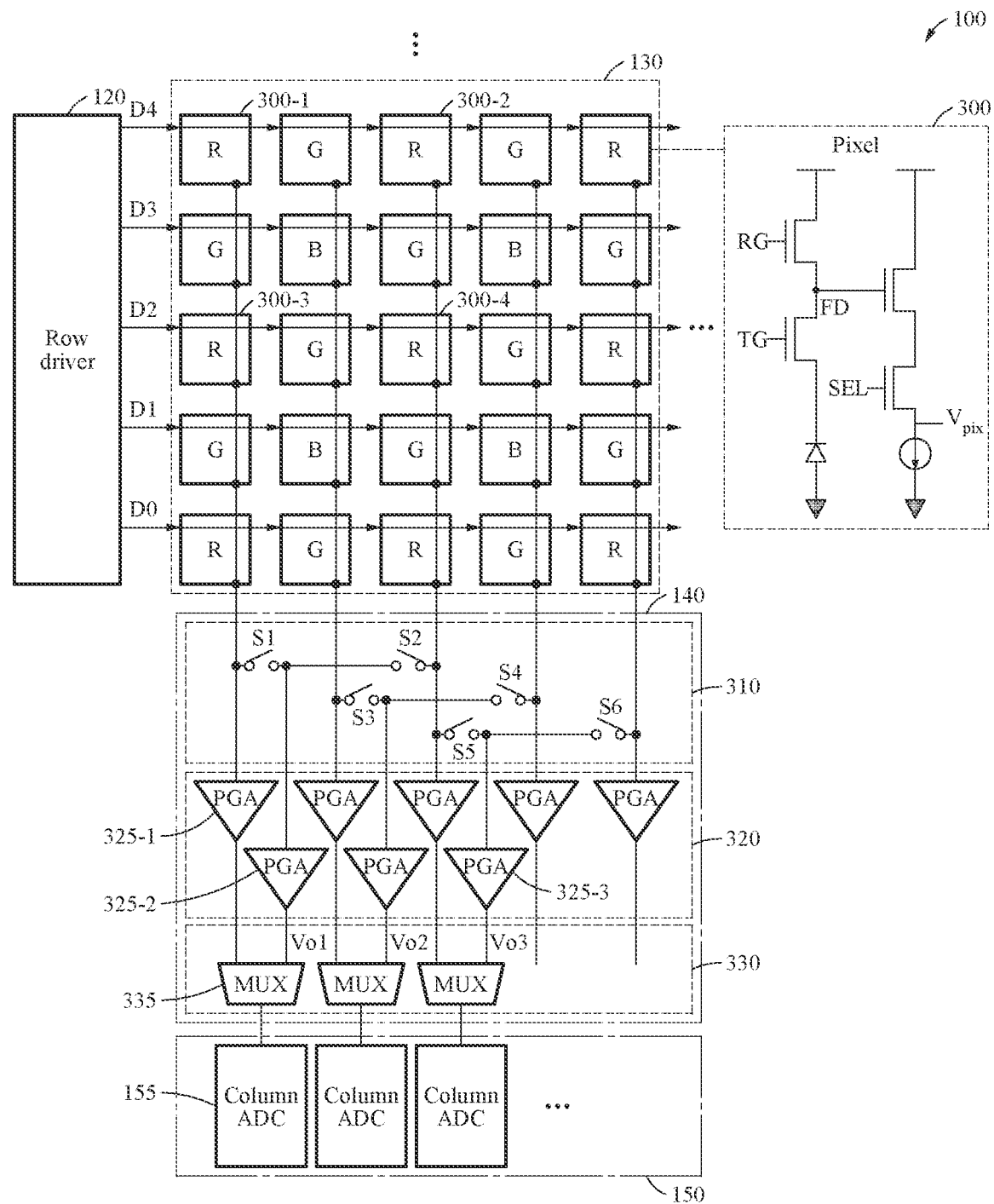
FIG. 3 illustrates an example of the image sensor of FIG. 1.

FIG. 3 illustrates an example of the image sensor 100 of FIG. 1.

Referring to FIG. 3, the image sensor 100 may perform binning according to the second Bayer method 130-3 illustrated in FIG. 2C. The binning block 140 may perform binning according to the second Bayer method 130-3 in a low-illuminance environment.

The pixel array 130 may include a plurality of pixels 300. The pixels 300 may include a floating diffusion (FD) node, and transmit an electric charge output from a photoelectric transformation element to the FD node.

When performing binning, a method of merging electric charges at the FD node may minimize noise. However, when the electric charges are merged at the FD node, the charges may not be restored.

Thus, to reuse the charges of the pixels 300, a voltage output $V_{pix}$ of a pixel source follower may be used. The voltage output $V_{pix}$ of the pixel source follower may be a voltage of a column bus node of the pixels 300.

An output voltage of the pixels 300 may be reused by controlling different switches connected to column lines of the pixels 300. For example, as illustrated, two switches S2 and S5 may be connected to a column line of a pixel 300-2. In this example, an output voltage may be transmitted to an amplifier 325-1 when the switch S2 is switched on, and the output voltage may be transmitted to an amplifier 325-3 when the switch S5 is switched on.

The binning block 140 includes a switch block 310, an amplifier block 320, and a multiplexer block 330.

The switch block 310 includes a plurality of switches S1 through S6 connected to a column line of the pixel array 130. The switches S1 through S6 may be connected to a column bus node of pixels of corresponding column lines. For example, pixels of first two and last two column lines of the pixel array 130 may be connected to a single switch, and pixels of other column lines may be connected to two switches.

The control circuit 110 may control the switch block 310 based on an illuminance of an environment in which the image sensor 100 operates. At a high illuminance, the control circuit 110 may open all the switches of the pixel array 130 and transmit an output signal of a Bayer pattern to the amplifier block 320 without a change. At a low illuminance, the control circuit 110 may control on-off timing of a switch and transmit an output signal to the amplifier block 320 to allow binning to be performed at the low illuminance.

The amplifier block 320 includes a plurality of amplifiers including amplifiers 325-1, 325-2, and 325-3. The amplifier block 320 may include a plurality of amplifiers corresponding to a column line and a plurality of amplifiers for binning. For example, the amplifier 325-1 may be an amplifier corresponding to a column line, and the amplifiers 325-2 and 325-3 may be amplifiers for binning.

An amplifier of the amplifier block 320 may be a programmable gain amplifier (PGA). The amplifier may amplify an input signal, and merge a plurality of input signals and amplify the merged input signal. For example, an amplifier corresponding to a column line may amplify a single input signal and output the amplified input signal, and an amplifier for binning may merge a plurality of input signals, amplify the merged input signal, and output the amplified input signal.

The amplifier for binning may be connected to a plurality of switches. The amplifier for binning may be connected to switches connected to a plurality of column lines. For example, the amplifier 325-2 may be connected to the switch S1 corresponding to a first column line and the switch S2 corresponding to a third column line.

The amplifier for binning may merge input signals based on on-off timing of a connected switch. The control circuit 110 may merge input signals by controlling the amplifier and the on-off timing of the switch connected to the amplifier. For example, the control circuit 110 may control the amplifier 325-2 and on-off timing of the switches S1 and S2 to merge an output signal of the first column line and an output signal of the third column line. Hereinafter, a binning operation of the switch block 310 and the amplifier block 320 will be described in detail with reference to FIGS. 4A and 4B.

The multiplexer block 330 includes a plurality of multiplexers 335. The multiplexers 335 may select one of an output of the amplifier 325-1 corresponding to a column line and an output of the amplifier 325-2 for binning, and output the selected output.

The multiplexers 335 may select one of input signals based on an illuminance of an environment in which the image sensor 100 operates. The multiplexers 335 may output the output of the amplifier 325-1 and the output of the amplifier 325-2 based on a signal transmitted from the control circuit 110 based on an illuminance. The multiplexers 335 may transmit, to the ADC block 150, the output of the amplifier 325-2 that is a signal obtained through binning performed in a low illuminance environment. The multiplexers 335 may transmit, to the ADC block 150, the output of the amplifier 325-1 that is amplified from an output voltage of the pixel array 130 output through the column line in a high illuminance environment.

The ADC block 150 includes a plurality of column ADCs 155. Each of the column ADCs 155 may correspond to each column line. The column ADCs 155 may convert an output signal of the multiplexers 335 to a digital signal.

Figure 4A:
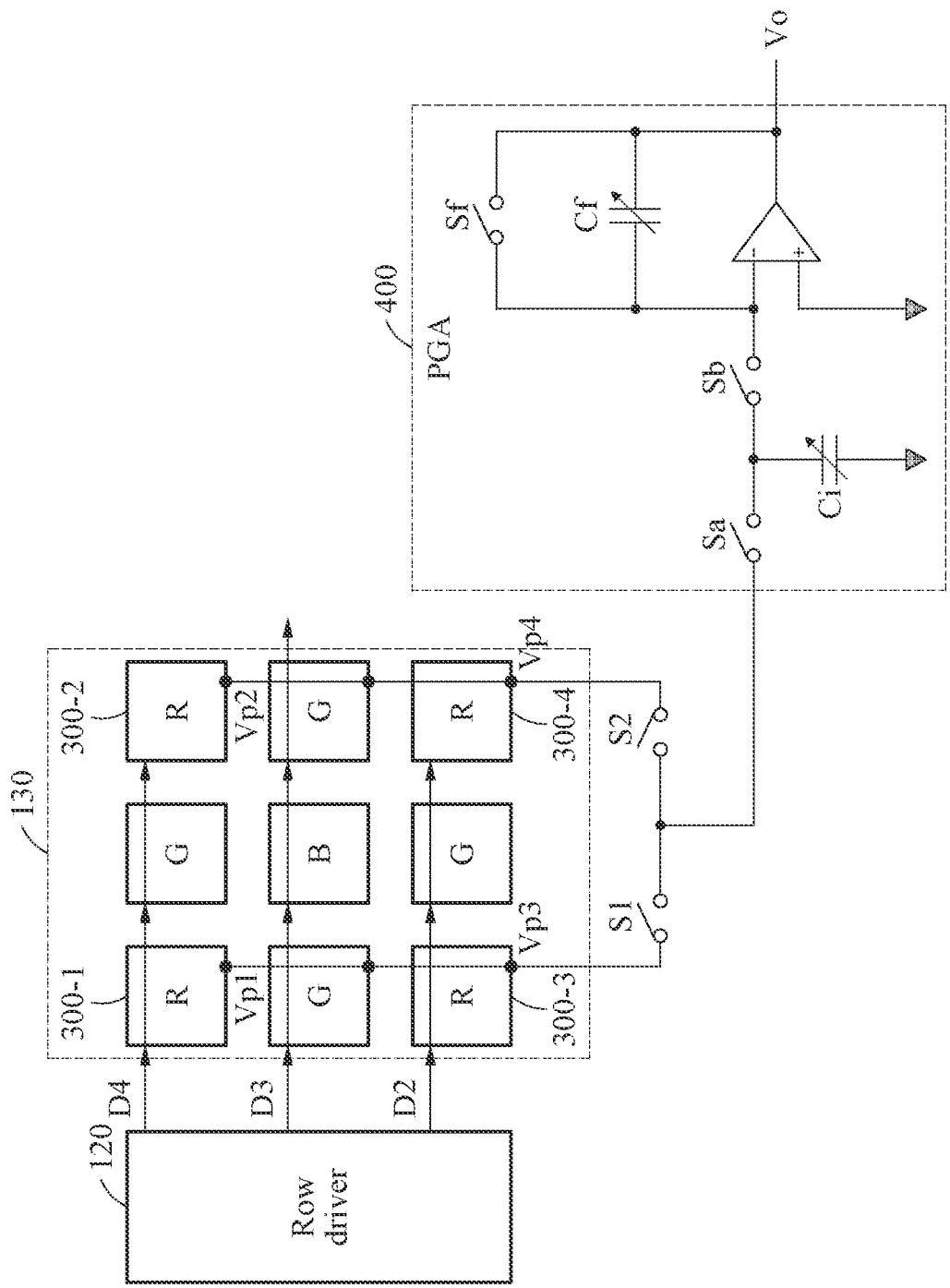
FIGS. 4A and 4B illustrate an example of binning performed by the image sensor of FIG. 1.
Figure 4B:
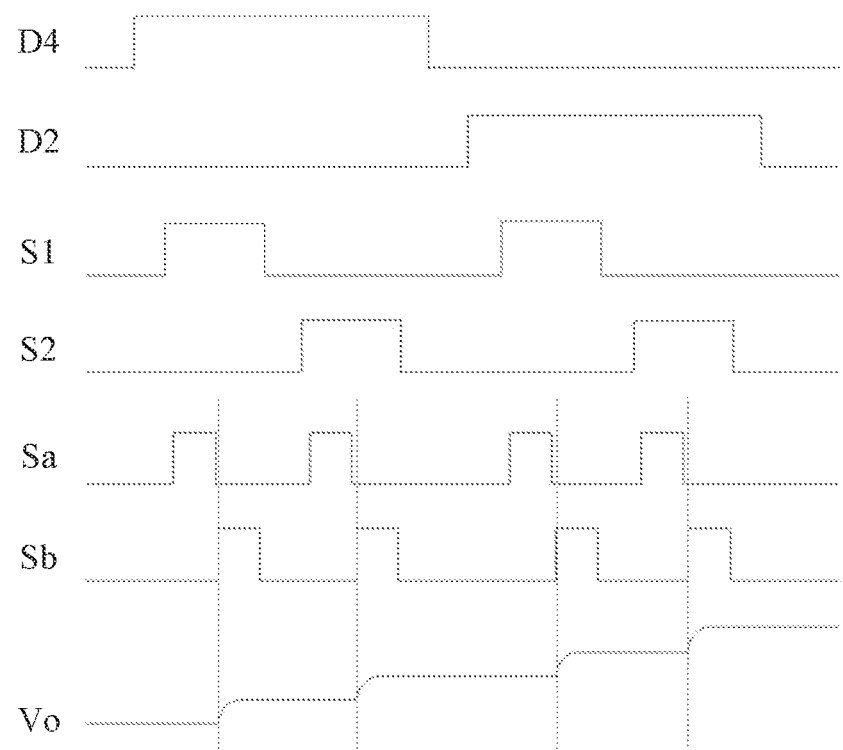

FIGS. 4A and 4B illustrate an example of binning performed by the image sensor 100 of FIG. 1.

Referring to FIGS. 4A and 4B, output voltages of pixels 300-1 through 300-4 may be added for binning. Here, operations of switches S1 and S2 and an amplifier 400 to be performed to merge the pixels 300-1 through 300-4 may also be applicable to a switch and an amplifier connected to a pixel for merging it with other pixels. That is, the amplifier 400 may correspond to amplifiers for performing binning described above with reference to FIG. 3, and an output Vo of the amplifier 400 may correspond to outputs Vo1 through Vo3 of the amplifiers for binning described above with reference to FIG. 3.

The row driver 120 may activate a first pixel 300-1 and a second pixel 300-2 using a control signal D4. The first pixel 300-1 and the second pixel 300-2 that are activated may transmit output voltages through respective column lines.

For example, as illustrated, when the first pixel 300-1 is activated, the control circuit 110 may switch on the switch S1 and output, to the amplifier 400, an output voltage Vp1 of the first pixel 300-1. When the output voltage Vp1 is received, the amplifier 400 may switch on a switch Sa and a switch Sb in sequential order and add the output voltage Vp1 to the output voltage Vo of the amplifier 400.

When the switch S2 is switched on, an output voltage Vp2 of the activated second pixel 300-2 may be output to the amplifier 400. As described above in relation to the output voltage Vp1 of the first pixel 300-1, when the switches Sa and Sb are switched on in sequential order, the output voltage Vp2 of the second pixel 300-2 may be added to the output voltage Vo of the amplifier 400.

After the output voltage Vp1 of the first pixel 300-1 and the output pixel Vp2 of the second pixel 300-2 are added, the row driver 120 may inactivate the first pixel 300-1 and the second pixel 300-2 using the control signal D4, and activate the third pixel 300-3 and the fourth pixel 300-4 using a control signal D2.

For the third pixel 300-3 and the fourth pixel 300-4 that are activated, the control circuit 110 may control the switches S1, S2, Sa, and Sb, and add respective output voltages Vp3 and Vp4 of the third pixel 300-3 and the fourth pixel 300-4 to the output voltage Vo of the amplifier 400, in a same way as described above in relation to the first pixel 300-1 and the second pixel 300-2.

For example, as illustrated, when the third pixel 300-3 is activated, the control circuit 110 may switch on the switch S1 and output, to the amplifier 400, an output voltage Vp3 of the third pixel 300-3. When the output voltage Vp3 is received, the amplifier 400 may switch on a switch Sa and a switch Sb in sequential order and add the output voltage Vp3 to the output voltage Vo of the amplifier 400.

When the fourth pixel 300-4 is activated, the control circuit 110 may switch on the switch S2 and output, to the amplifier 400, an output voltage Vp4 of the activated fourth pixel 300-4. When the switches Sa and Sb are switched on in sequential order, the output voltage Vp4 of the fourth pixel 300-4 may be added to the output voltage Vo of the amplifier 400.

As described above, the control circuit 110 may control the control signals D2 and D4 of the row driver 120 and the switches S1, S2, Sa, and Sb as illustrated in FIG. 4B, and add the output voltages Vp1 through Vp4 of the first through fourth pixels 300-1 through 300-4. The output Vo of the amplifier 400 in which the output voltages Vp1 through Vp4 are added may be represented by Equation 1 below. In Equation 1, $C_i$ and $C_f$ denote capacitance of capacitors in an amplifier.

$$Vo = \frac{Ci}{Cf}(Vp1 + Vp2 + Vp3 + Vp4) \quad \text{[Equation 1]}$$

Figure 5:
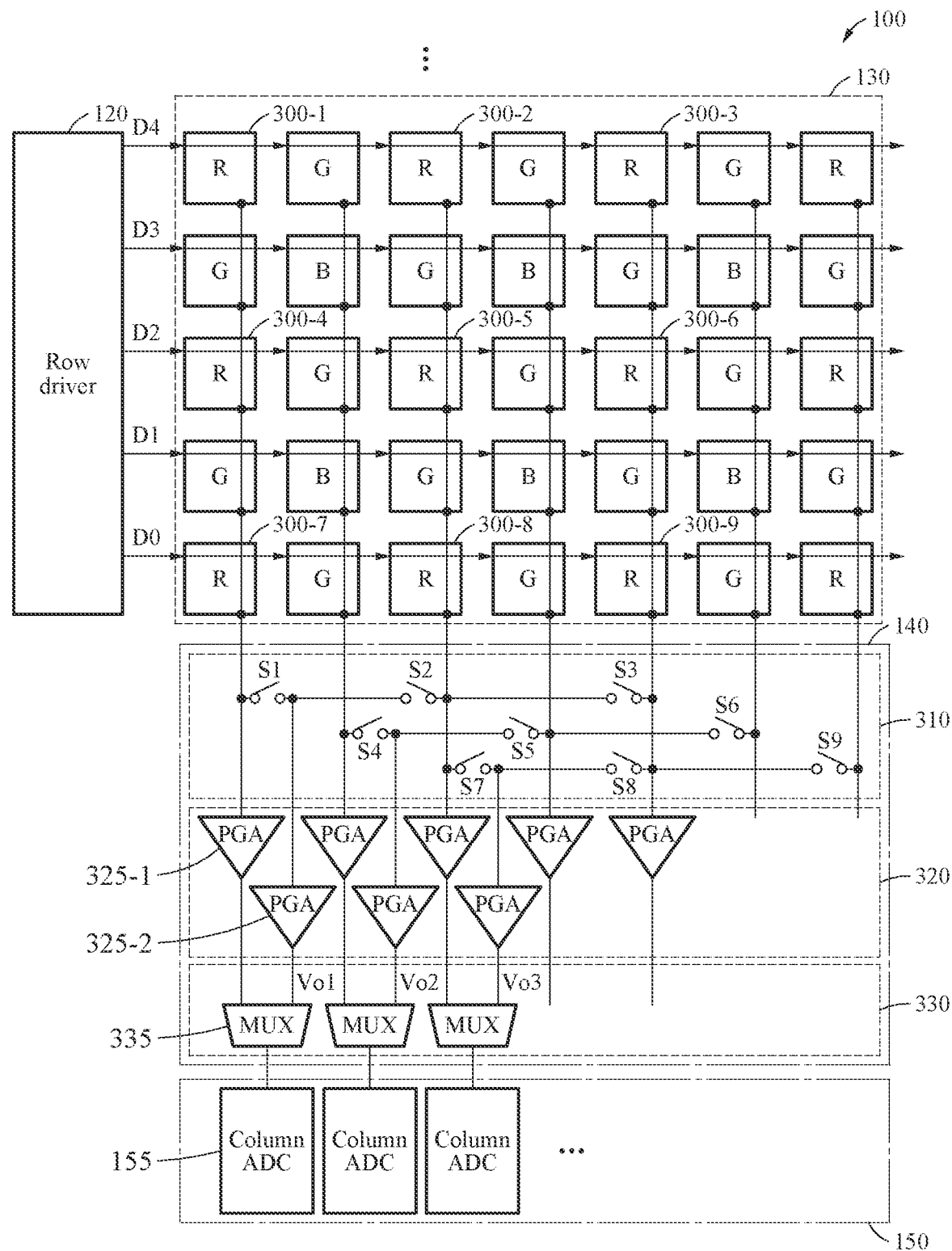
FIG. 5 illustrates another example of the image sensor of FIG. 1.

FIG. 5 illustrates another example of the image sensor 100 of FIG. 1.

Referring to FIG. 5, the image sensor 100 may perform binning according to the extended second Bayer method 130-4 that is extended to a 3*3 size as illustrated in FIG. 2D. To perform binning according to the extended second Bayer method 130-4, a structure of the switch block 310 may be changed.

An amplifier for performing binning may be connected to three switches and add output voltages of nine pixels. For example, as illustrated, an amplifier 325-2 may be connected to three switches S1, S2, and S3, and add output voltages of nine pixels 300-1 through 300-9 based on the switches S1, S2, and S3, and control signals D0, D2, and D4 of the row driver 120.

The control circuit 110 may control an amplifier and a switch in a similar way to performing binning according to a second Bayer method. For example, the control circuit 110 may activate pixels in a certain row through the row driver 120, switch on switches connected to the activated pixels in sequential order, and add output voltages of the pixels.

Based on the number of switches connected to an amplifier for binning, the image sensor 100 may perform binning based on a second Bayer method extended to a size of 3*3 or greater. For example, the image sensor 100 may connect, to an amplifier for binning, switches corresponding to four column lines and perform binning according to a second Bayer method extended to a 4*4 size. According to other example embodiments, in a similar way, the image sensor 100 may perform binning according to a second Bayer method extended to an N*N size.

The multiplexer block 330 and the ADC block 150 may operate the same as described above with reference to FIG. 3.

Figure 6:
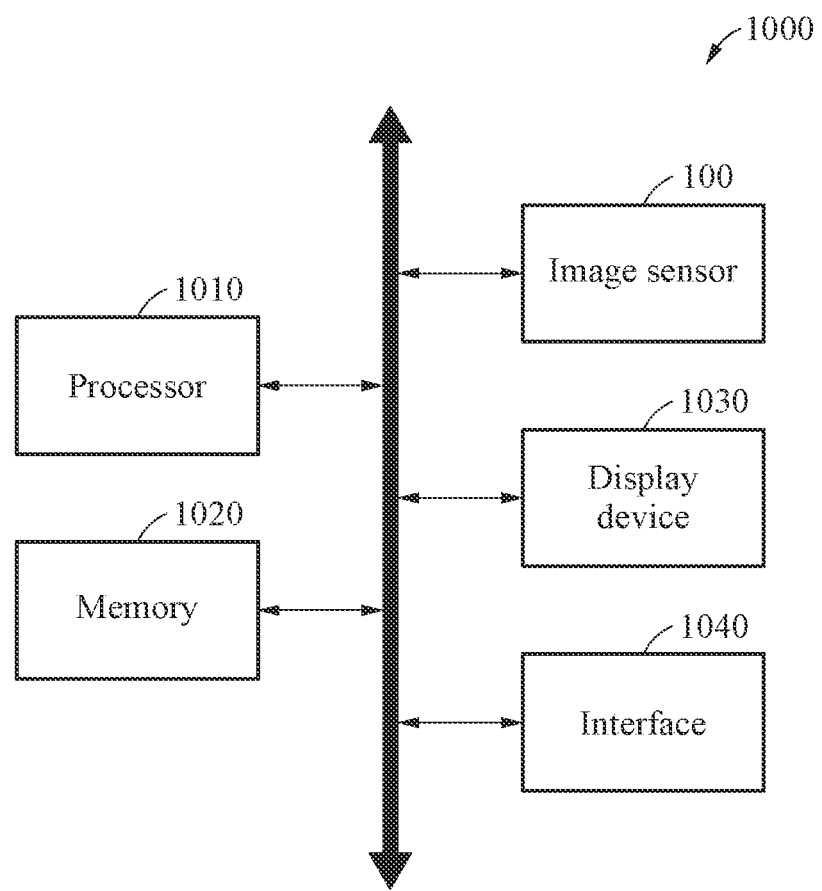
FIG. 6 illustrates an example of a configuration of an imaging system including the image sensor of FIG. 1.

FIG. 6 illustrates an example of a configuration of an imaging system including the image sensor 100 of FIG. 1.

Referring to FIG. 6, an imaging system 1000 includes the image sensor 100, a processor 1010, a memory 1020, a display device 1030, and an interface 1040. Each of the image sensor 100, the processor 1010, the memory 1020, the display device 1030, and the interface 1050 may transmit or receive data through a bus.

The processor 1010 may control an operation of the image sensor 100. The processor 1010 may process a pixel signal output from the image sensor 100 to generate image data.

The memory 1020 may store a program for controlling the operation of the image sensor 100 and the image data generated by the processor 1010. The processor 1010 may execute the program stored in the memory 1020. The memory 1020 may be embodied by a volatile memory or a nonvolatile memory, for example.

The display device 1030 may display the image data output from the processor 1010 or the memory 1020. The interface 1040 may be embodied by an interface for inputting and outputting the image data. The interface 1040 may be embodied as a wireless interface, for example.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

Example embodiments include non-transitory computer-readable media including program instructions to implement various operations embodied by a computer. The media may also include, alone or in combination with the program instructions, data files, data structures, tables, and the like. The media and program instructions may be those specially designed and constructed for the purposes of example embodiments, or they may be of the kind well known and available to those having skill in the computer software arts. Examples of non-transitory computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random-access memory (RAM). Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

While example embodiments have been described with reference to the figures, it will be apparent to one of ordinary skill in the art that various changes in form and details may be made in these examples without departing from the spirit and scope of the claims and their equivalents.

What is claimed is:

1. An operation method of an image sensor comprising a plurality of pixels, the operation method comprising:
    transmitting a first output voltage of a first pixel to a first amplifier;
    transmitting the first output voltage to a second amplifier by controlling a first switch connected to the first pixel;
    transmitting a second output voltage of a second pixel to be binned with the first pixel to the second amplifier by controlling a second switch connected to the second pixel; and outputting selectively one of a first output of the first amplifier and a second output of the second amplifier, based on an illuminance of an environment in which the image sensor operates.

2. The operation method of claim 1, wherein each of the first output voltage of the first pixel and the second output voltage of the second pixel is an output voltage of a pixel source follower corresponding to a collected electric charge of each of the first pixel and the second pixel.

3. The operation method of claim 1, wherein the second amplifier is configured to add the first output voltage of the first pixel and the second output voltage of the second pixel based on on-off timing of the first switch and on-off timing of the second switch.

4. The operation method of claim 1, wherein the outputting comprises:
generating a control signal based on the illuminance; and
controlling a multiplexer to which the first output of the first amplifier and the second output of the second amplifier are input based on the control signal.

5. The operation method of claim 1, further comprising:
transmitting the second output voltage of the second pixel to a third amplifier by controlling a third switch connected to the second pixel.

6. The operation method of claim 1, wherein each of the plurality of pixels is one of a red pixel, a green pixel, and a blue pixel, and the plurality of pixels are provided in a Bayer pattern.

7. The operation method of claim 5, wherein the second pixel is provided in a same row as the first pixel, and
wherein a color of the second pixel is same as a color as the first pixel.

8. The operation method of claim 1, wherein the plurality of pixels are respectively configured to generate an output signal based on incident light transmitted through a lens array that comprises a plurality of lenses.

9. An image sensor comprising:
a pixel array comprising a plurality of pixels;
a row driver configured to control the pixel array;
a binning circuit comprising a plurality of switches, a plurality of amplifiers, and a plurality of multiplexers;
an analog-to-digital converter (ADC) circuit configured to process an output of the binning circuit; and
a control circuit configured to control the row driver, the binning circuit, and the ADC circuit,
wherein the binning circuit is further configured to:
transmit a first output voltage of a first pixel to a first amplifier by controlling the row driver;
transmit the first output voltage to a second amplifier by controlling a first switch connected to the first pixel;
transmit a second output voltage of a second pixel to be binned with the first pixel to the second amplifier by controlling a second switch connected to the second pixel; and
output selectively one of a first output of the first amplifier and a second output of the second amplifier based on an illuminance of an environment in which the image sensor operates.

10. The image sensor of claim 9, wherein each of the first output voltage of the first pixel and the second output voltage of the second pixel is an output voltage of a pixel source follower corresponding to a collected electric charge of each of the first pixel and the second pixel.

11. The image sensor of claim 9, wherein the second amplifier is configured to add the first output voltage of the first pixel and the second output voltage of the second pixel based on on-off timing of the first switch and on-off timing of the second switch.

12. The image sensor of claim 9, wherein the control circuit is further configured to:
generate a control signal based on the illuminance; and
control a multiplexer to which the first output of the first amplifier and the second output of the second amplifier are input based on the control signal.

13. The image sensor of claim 9, wherein the binning circuit is further configured to:
transmit the second output voltage of the second pixel to a third amplifier by controlling a third switch connected to the second pixel.

14. The image sensor of claim 9, wherein each of the plurality of pixels is one of a red pixel, a green pixel, and a blue pixel, and the plurality of pixels are arranged in a Bayer pattern.

15. The image sensor of claim 14, wherein the second pixel is arranged in a same row as the first pixel, and
wherein a color of the second pixel is same as a color of the first pixel.

16. The image sensor of claim 9, wherein the plurality of pixels are respectively configured to generate an output signal based on incident light transmitted through a lens array that comprises a plurality of lenses.

17. An electronic device comprising:
an image sensor configured to output a digital signal, the image sensor comprising:
a pixel array comprising a plurality of pixels;
a row driver configured to control the pixel array;
a binning circuit comprising a plurality of switches, a plurality of amplifiers, and a plurality of multiplexers;
an analog-to-digital converter (ADC) circuit configured to process an output of the binning circuit; and
a control circuit configured to control the row driver, the binning circuit, and the ADC circuit,
wherein the binning circuit is further configured to:
transmit a first output voltage of a first pixel to a first amplifier by controlling the row driver;
transmit the first output voltage to a second amplifier by controlling a first switch connected to the first pixel;
transmit a second output voltage of a second pixel to be binned with the first pixel to the second amplifier by controlling a second switch connected to the second pixel; and
output selectively one of a first output of the first amplifier and a second output of the second amplifier based on an illuminance of an environment in which the image sensor operates;
a memory configured to store the digital signal output from the image sensor; and
a processor configured to control the image sensor and the memory.

18. The image sensor of claim 17, wherein each of the first output voltage of the first pixel and the second output voltage of the second pixel is an output voltage of a pixel source follower corresponding to a collected electric charge of each of the first pixel and the second pixel.

19. The image sensor of claim 17, wherein the second amplifier is configured to add the first output voltage of the first pixel and the second output voltage of the second pixel based on on-off timing of the first switch and on-off timing of the second switch.

20. The image sensor of claim 17, wherein the control circuit is further configured to:
   generate a control signal based on the illuminance; and
   control a multiplexer to which the first output of the first amplifier and the second output of the second amplifier are input based on the control signal.

* * * * *